(12) United States Patent
Yanagawa et al.

(10) Patent No.: US 9,428,148 B2
(45) Date of Patent: Aug. 30, 2016

(54) WEBBING TAKE-UP DEVICE

(71) Applicant: KABUSHIKI KAISHA TOKAI-RIKA-DENKI-SEISAKUSHO, Aichi-ken (JP)

(72) Inventors: Wataru Yanagawa, Aichi-ken (JP); Kengo Miura, Aichi-ken (JP)

(73) Assignee: KABUSHIKI KAISHA TOKAI-RIKA-DENKI-SEISAKUSHO, Aichi-ken (JP)

(*) Notice: Subject to any disclaimer, the term of this patent is extended or adjusted under 35 U.S.C. 154(b) by 174 days.

(21) Appl. No.: 14/172,227

(22) Filed: Feb. 4, 2014

(65) Prior Publication Data
US 2014/0224912 A1    Aug. 14, 2014

(30) Foreign Application Priority Data

Feb. 8, 2013 (JP) .................................. 2013-023779

(51) Int. Cl.
*B60R 22/46* (2006.01)

(52) U.S. Cl.
CPC ...... *B60R 22/4633* (2013.01); *B60R 2022/468* (2013.01)

(58) Field of Classification Search
USPC ........................................................ 242/374
See application file for complete search history.

(56) References Cited

U.S. PATENT DOCUMENTS

| | | | | |
|---|---|---|---|---|
| 5,397,075 A | * | 3/1995 | Behr | ................... B60R 22/1955 242/374 |
| 5,553,890 A | * | 9/1996 | Bühr | ................... B60R 22/4633 242/374 |
| 5,697,571 A | * | 12/1997 | Dybro | ................. B60R 22/4628 242/374 |
| 2004/0169105 A1 | * | 9/2004 | Wier | ................... B60R 22/4633 242/374 |
| 2009/0039634 A1 | * | 2/2009 | Krauss | ................ B60R 22/4633 280/806 |
| 2012/0305694 A1 | * | 12/2012 | Ford | ..................... B64D 25/06 242/374 |

FOREIGN PATENT DOCUMENTS

| | | |
|---|---|---|
| JP | 2009-241864 A | 10/2009 |
| WO | 2009020500 | 2/2009 |
| WO | 2012166863 | 12/2012 |

OTHER PUBLICATIONS

Extended European patent search Application No. 14153918.9-1503 dated Jun. 10, 2014.

* cited by examiner

*Primary Examiner* — Sang Kim
(74) *Attorney, Agent, or Firm* — Roberts Mlotkowski Safran Cole & Calderon, PC

(57) ABSTRACT

In a webbing take-up device, a cylinder includes a housing portion that houses a piston and a guide portion that extends from one end portion in length direction of the housing portion. A pinion is rotatably supported at the guide portion. The piston is guided by the guide portion. A member that houses the piston and a member that rotatably supports the pinion do not accordingly need to be separately provided. An increase in number of components can therefore be suppressed. Positioning of the piston and the pinion can be respectively determined by the cylinder due to the piston and the pinion being provided to the cylinder. Good positioning precision between the piston and the pinion is thereby enabled compared to a case where separate members are used to house the piston and to rotatably support the pinion.

8 Claims, 6 Drawing Sheets

WEBBING TAKE-UP DEVICE

CROSS-REFERENCE TO RELATED APPLICATION

This application claims priority under 35 USC 119 from Japanese Patent Application No. 2013-023779, filed Feb. 8, 2013, the disclosure of which is incorporated by reference herein.

BACKGROUND

1. Field of the Invention

The present invention relates to a webbing take-up device that takes up webbing.

2. Related Art

Japanese Patent Application Laid-Open (JP-A) No. 2009-241864 describes a seatbelt retractor provided with a pre-tensioning mechanism that forces a guide drum (spool) to rotate in the take-up direction in the event such as a vehicle collision. The pre-tensioning mechanism is actuated such as in the event of a vehicle collision so as to move a piston, and a rack provided at the piston meshes with a pinion and the pinion is rotated. The guide drum is thereby rotated in the take-up direction.

However, in the seatbelt retractor described above, the piston is provided at a pipe cylinder inside, and the pinion is rotatably supported at a cover plate. Namely, the pre-tensioning mechanism described above is configured with the pipe cylinder and the cover plate provided being as separate members. There is accordingly room for improvement from the view point of suppressing an increase in the number of components and in achieving good positioning precision between the piston and the pinion.

SUMMARY

In consideration of the above circumstances, the present invention provides a webbing take-up device that enables an increase in the number of components to be suppressed, and enables good positioning precision between a piston and a pinion.

A first aspect is a webbing take-up device including: a spool that takes up a webbing by rotating in a take-up direction; a pinion that is rotatable; a piston that moves under actuation of a gas generator, and that meshes with the pinion when moving, whereby the spool is rotated in the take-up direction according to rotation of the pinion; and a cylinder that is configured from a single member and that includes: a tube shaped housing portion that houses the piston, and a guide portion that guides movement of the piston, that extends from one end portion of the housing portion in a length direction of the housing portion toward a moving direction side of the piston, and that rotatably supports the pinion.

In the webbing take-up device of the first aspect, upon actuation of the gas generator, the piston moves toward the pinion side and meshes with the pinion. The spool is thereby rotated in the take-up direction according to (in conjunction with) rotation of the pinion, and the webbing is taken up by the spool. As a result, a restraining force applied to a seated occupant by the webbing is increased.

The cylinder includes the tube shaped housing portion that houses the piston. Moreover, the cylinder includes the guide portion, the guide portion extending from the one end portion of the housing portion in the length direction toward the piston movement direction side. Namely, the cylinder that includes the housing portion and the guide portion is configured as a single member. Moreover, the guide portion rotatably supports the pinion, and the movement of the piston is guided by the guide portion.

It is therefore unnecessary to separately provide a member that houses the piston and a member that rotatably supports the pinion, since the webbing take-up device of the first aspect is configured with the cylinder configured as a single member to which the piston and the pinion are provided. An increase in the number of components can thereby be suppressed. Respective positioning of the pinion and the piston is accordingly determined by the cylinder due to provision of the piston and the pinion to the cylinder. Good positioning precision of the piston and the pinion is thereby enabled compared to a case in which the piston and the pinion are provided to different members.

A second aspect is the webbing take-up device of the first aspect, wherein the cylinder is configured by a pipe member.

In the webbing take-up device of the second aspect, the cylinder is configured by the pipe member. The comparatively high complete round characteristic (complete circularity) of the piping member can therefore be used, enabling forming of an inner peripheral face of the housing portion and a face that guides the piston at the guide portion. Smooth movement of the piston inside the cylinder can thereby be achieved, enabling stabilization of the piston movement inside the cylinder.

A third aspect is the webbing take-up device of the first aspect or the second aspect, wherein: the guide portion is formed in a groove shape that is open toward an outer side in a radial direction of the cylinder, and is configured to include a pair of side walls disposed facing each other and a bottom wall that connects the pair of side walls; a support portion that rotatably supports the pinion is formed at the pair of side walls; and a through-passage portion that permits movement of the pinion is formed inside the bottom wall.

In the webbing take-up device of the third aspect, the guide portion is formed as a groove shape open toward the cylinder radial direction outside. Namely, the guide portion is formed with an open cross-section profile. Moreover, the guide portion is configured including: the pair of side walls that are disposed facing each other; and the bottom wall that connects the pair of side walls. The support portion that rotatably supports the pinion is formed at the pair of side walls. The pinion is thereby disposed between the pair of side walls and the pinion is rotatably supported by the pair of side walls. Moreover, a through-passage portion that permits the movement of the piston is formed at the bottom wall inside. The piston therefore moves through the through-passage portion inside and the movement of the piston is guided by the bottom wall. Therefore, even though the cylinder is formed as a single member, by forming one portion of the cylinder (the guide portion) as a groove shape (an open cross-section profile), the pinion can be rotatably supported, and the piston movement can be guided. Rotatable support of the pinion and guiding of the piston movement are thereby enabled by means of a simple configuration.

Moreover, the pair of side walls at which the support portion is formed, and the bottom wall that guides the piston movement are formed continuously, thereby enabling even better positioning precision to be achieved between the bottom wall and the support portion. The allowance degree (amount) in tooth meshing between the piston and the pinion when the piston moves can thereby be ensured, enabling good meshing between the piston and the pinion to be achieved.

A fourth aspect of is the webbing take-up device of the third aspect, wherein: the side walls are fixed by a fixing member to a frame that supports the spool; and the fixing member is disposed such that the fixing member and the piston overlap when the piston has moved a maximum extent as viewed from the bottom wall side of the guide portion.

In the webbing take-up device of the fourth aspect, when the piston has moved to the maximum extent, the fixing member and the piston are set so as to overlap as viewed from the bottom wall side of the guide portion. The length in the length direction of the cylinder can accordingly be set shorter compared to a case where the fixing portion is disposed further toward the one side in the length direction of the cylinder than the piston when the piston has moved to the maximum extent. Becoming larger of the cylinder can be suppressed thereby.

A fifth aspect of the present invention is the webbing take-up device from any one of the first to the fourth aspects, wherein an abutting portion is formed at the piston, and movement of the piston is stopped by the abutting portion abutting the pinion.

In the webbing take-up device of the fifth aspect, the movement of the piston is stopped by the abutting portion abutting the pinion. The pinion can therefore be used as a stopping member. It is thereby not needed to provide additionally a separate stopping member, and an increase in the number of components can be suppressed.

According to the webbing take-up device of the first aspect, an increase in the number of components can be suppressed, and good positioning precision can be achieved between the piston and the pinion.

According to the webbing take-up device of the second aspect, stabilization of the piston movement inside the cylinder is enabled.

According to the webbing take-up device of the third aspect, a good placement structure of the guide portion can be achieved. Good meshing between the pinion and the piston is enabled.

According to the webbing take-up device of the fourth aspect, rotatable support of the pinion and guiding of the piston movement are enabled by means of a simple configuration. Moreover, good meshing can be achieved between the piston and the pinion when the piston moves.

According to the webbing take-up device of the fifth aspect, an increase in the number of components can be suppressed.

BRIEF DESCRIPTION OF THE DRAWINGS

Embodiments of the invention will be described in detail with reference to the following figures, wherein.

DETAILED DESCRIPTION

Figure 1:
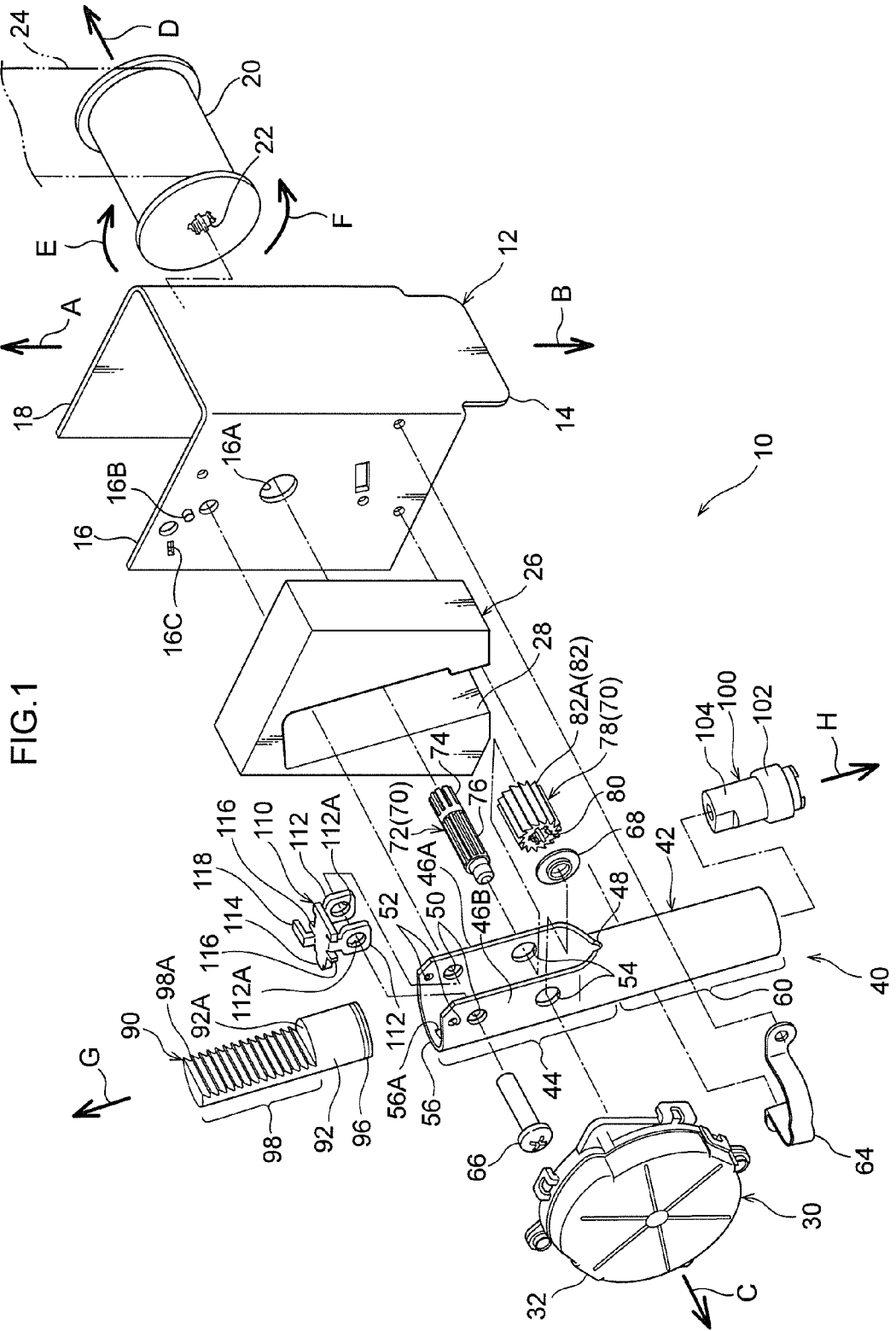
FIG. 1 is an exploded perspective view illustrating a webbing take-up device of an exemplary embodiment.
Figure 2:
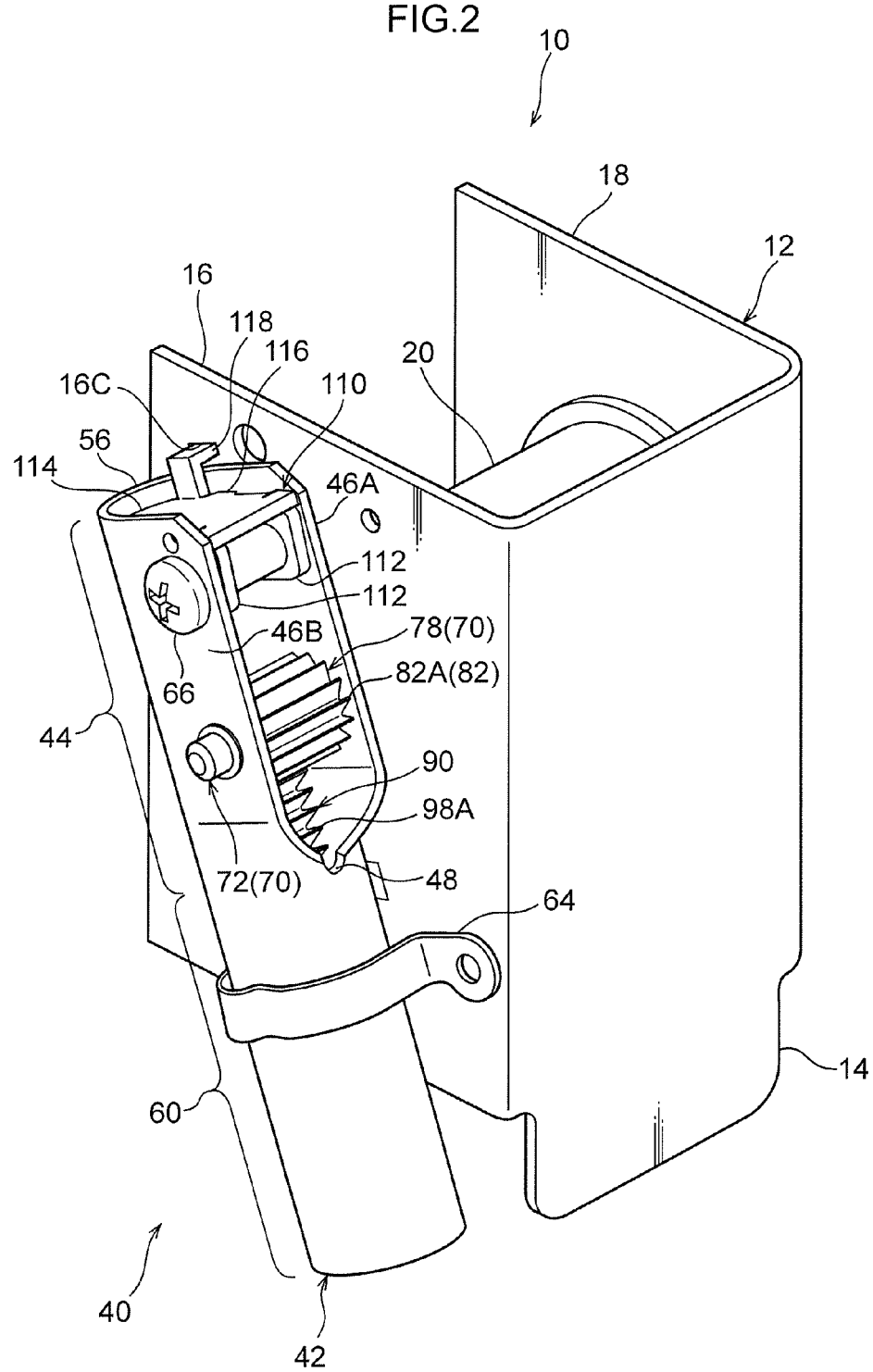
FIG. 2 is a perspective view illustrating a pre-tensioning mechanism of the webbing take-up device illustrated in FIG. 1.
Figure 3:
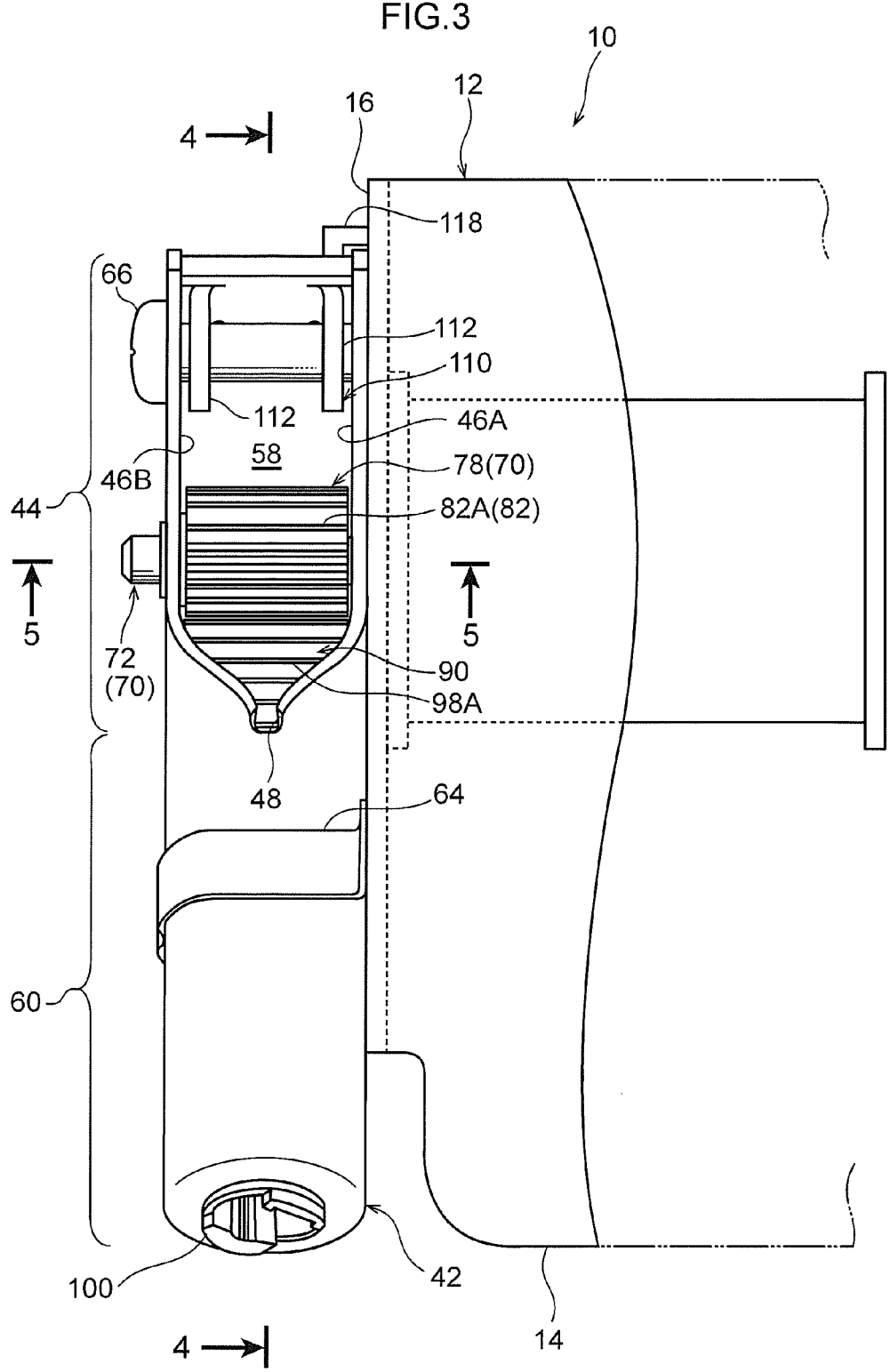
FIG. 3 is a front view illustrating the pre-tensioning mechanism illustrated in FIG. 2 as viewed from the rear plate side of a frame.

Explanation is given below regarding a webbing take-up device 10 of an exemplary embodiment of the present invention, with reference to the drawings. As illustrated in FIG. 1 the webbing take-up device 10 of the present exemplary embodiment is configured including: a frame 12; a substantially drum shaped spool 20 that is disposed inside the frame 12; and a webbing 24 that extends from the spool 20. The webbing take-up device 10 is provided with: a body 26 that is disposed at the outside of the frame 12; a biasing mechanism 30; and a pre-tensioning mechanism 40. Explanation is given below regarding their respective configurations.

The frame 12 is provided with a plate shaped rear plate 14 that is fixed to the vehicle body of a vehicle (automobile). Leg plates 16 and 18 extend substantially perpendicularly from both width direction end portions of the rear plate 14. The frame 12 is formed with a substantially indented ("U") profile when viewed in a plan view from an upper side (from the arrow A direction side of FIG. 1). The leg plate 16 is formed with a circular shaped through hole 16A.

The spool 20 is disposed between the leg plate 16 and the leg plate 18, with its axial direction along the direction the leg plate 16 and the leg plate 18 face each other. A fitted-into concave portion 22 is formed at an axial center portion of one axial direction end portion (the arrow C direction side end portion in FIG. 1) of the spool 20. The fitted-into concave portion 22 is open toward one axial direction side of the spool 20 and is formed with a splined profile as viewed from the one axial direction side of the spool 20. A pinion shaft 72, described in detail below, is inserted into the fitted-into concave portion 22 so as to be capable of rotating as one therewith (see FIG. 5).

Moreover, a torsion shaft, not shown in the drawings, is inserted into the axial center portion of the spool 20 so as to be capable of rotating as one therewith. The torsion shaft protrudes from the spool 20 toward the other axial direction end side (the arrow D direction side of FIG. 1) of the spool 20. The pinion shaft 72 and the torsion shaft are supported by the frame 12 so as to be capable of rotation indirectly. The spool 20 is thereby configured rotatable.

The webbing 24 is formed with a long belt shape, with one length direction end portion (a base end portion) of the webbing 24 joined and fixed to the spool 20. The webbing 24 is taken up from the base end side thereof in layers onto an outer peripheral portion of the spool 20 by rotation of the spool 20 in the take-up direction (the arrow E direction in FIG. 1). Configuration is made such that the spool 20 rotates in the pull out direction (the arrow F direction in FIG. 1) and the webbing 24 is pulled out from the spool 20 when the other length direction end portion (leading end portion) of the webbing 24 is pulled.

The body 26 is formed with a substantially rectangular parallelopiped shape and is fixed to the leg plate 16 of the frame 12. An elongated, substantially rectangular shaped housing cavity 28 that houses a cylinder 42, explained in detail below, is formed in the body 26. The housing cavity 28 slopes toward the rear plate 14 side on progression toward a lower side (the arrow B direction side in FIG. 1) as viewed along the axial direction of the spool 20, and the housing cavity 28 is open at a lower side portion.

The biasing mechanism 30 is provided with a spring cover 32. The spring cover 32 is formed as a concave shape open toward the leg plate 16 side of the frame 12, and is fixed to the body 26 at the body 26 outside. A flat spiral spring (not shown in the drawings) is provided inside the spring cover 32 and one end of the flat spiral spring is joined to the leg plate 16 (the frame 12). Moreover, the other end of the flat spiral spring is joined to the pinion shaft 72, described in detail below, and the spool 20 is biased toward the take-up direction by the flat spiral spring.

Note that a locking mechanism, not shown in the drawings, is provided at the outside of the leg plate 18 of the frame 12. Configuration is made such that rotation of the spool 20 in the pull-out direction is restricted by the actuation of the locking mechanism in the event of the vehicle rapidly decelerating, or when the webbing 24 is pulled out rapidly.

Explanation follows regarding the pre-tensioning mechanism 40 that is a relevant portion of the present invention. The pre-tensioning mechanism 40 is a rack and pinion system, configured including the cylinder 42, a pinion 70, a piston 90, a gas generator 100 and a stopper plate 110.

The cylinder 42 is produced using circular cylindrical (tube) shaped metal pipe member. Moreover, the cylinder 42 is disposed inside the housing cavity 28 of the body 26 so as to incline toward the rear plate 14 side on progression toward the lower side as viewed along the axial direction of the spool 20. An upper portion of the cylinder 42 (a portion of one side in length direction (the arrow G direction side in FIG. 1) of the cylinder 42) is configured as a guide portion 44. The guide portion 44 is formed as a substantially U-shaped groove open toward a radial direction outside of the cylinder 42. Namely, cross-section of the guide portion 44 is an open cross-section profile.

As shown in FIGS. 1 to 4, the guide portion 44 is configured including a pair of side walls 46A and 46B and a bottom wall 56. The side walls 46A and 46B are disposed facing each other along the axial direction of the spool 20. Moreover, lower side portions of the pair of side walls 46A and 46B are curved (bent) so as to approach each other on progression toward another side in the length direction (the arrow H direction side in FIG. 1) of the cylinder 42, and converge at an outer peripheral portion of the cylinder 42. Moreover, the portion where the pair of side walls 46A and 46B converge is formed with a cut-out portion 48, and the cut-out portion 48 is formed with a concave shape that is open toward an upper end side of the cylinder 42 when viewed along the radial direction of the cylinder 42.

As illustrated in FIG. 1, circular shaped fixing holes 50 are formed respectively penetrating the pair of side walls 46A and 46B. A bolt 66 that serves as a fixing member is inserted through inside the fixing holes 50, and an upper end portion of the cylinder 42 is thereby fixed to the frame 12 by the bolt 66. Moreover, circular shaped positioning holes 52 are formed penetrating the pair of side walls 46A and 46B, which are at locations further toward the upper side than fixing holes 50. A circular column shaped boss 16B formed at the leg plate 16 of the frame 12 is inserted into the positioning hole 52 of the side wall 46A. Supporting holes 54 that serve as a support portion are formed penetrating the pair of side walls 46A and 46B, which are at locations further toward a lower side than the fixing holes 50, for rotatably supporting pinion 70, described below. The supporting holes 54 are formed with a circular shape and are disposed coaxially to the spool 20.

Figure 4:
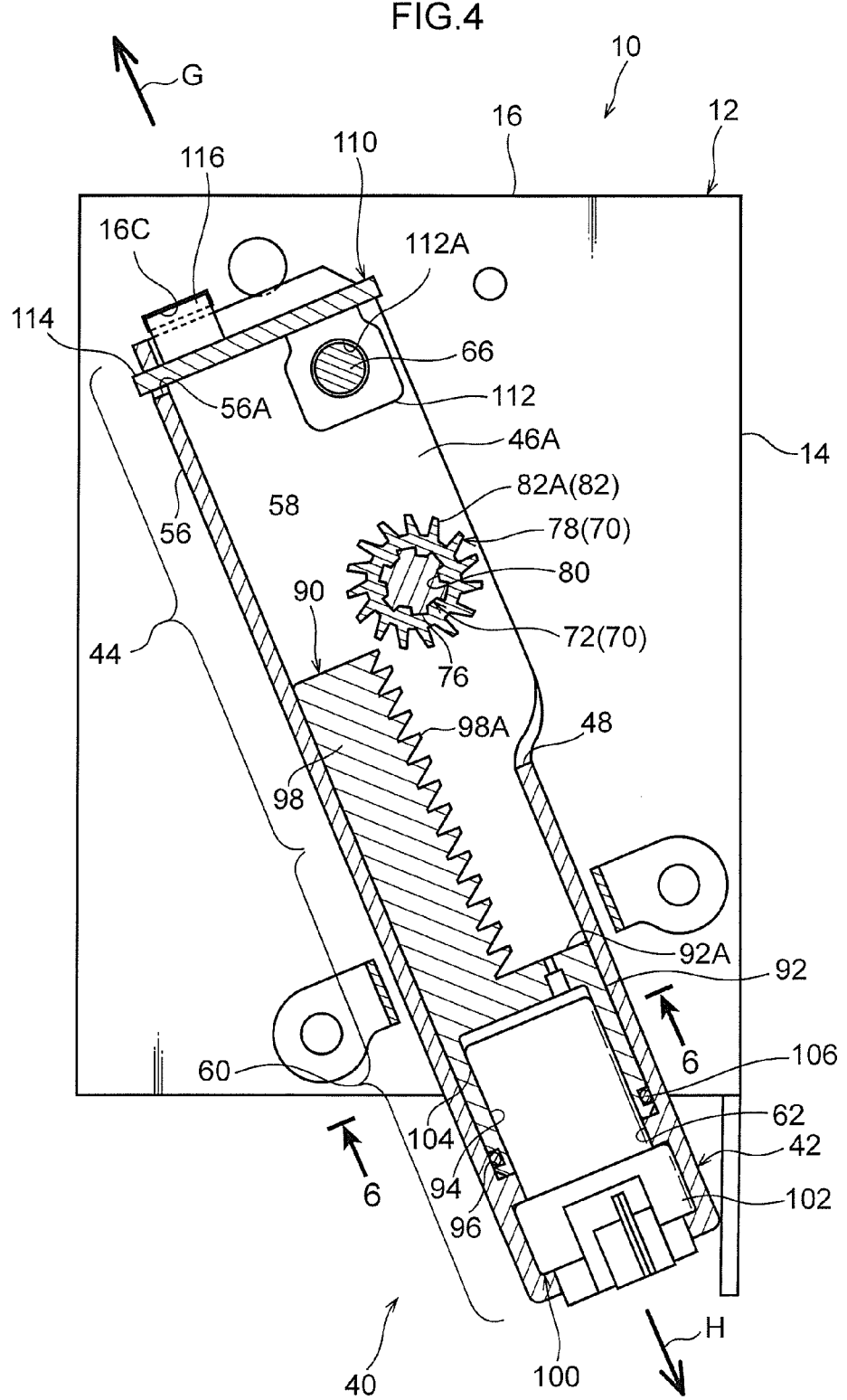
FIG. 4 is a side cross-section view (viewed in cross-section taken along line 4-4 in FIG. 3) illustrating the pre-tensioning mechanism illustrated in FIG. 3.
Figure 5:
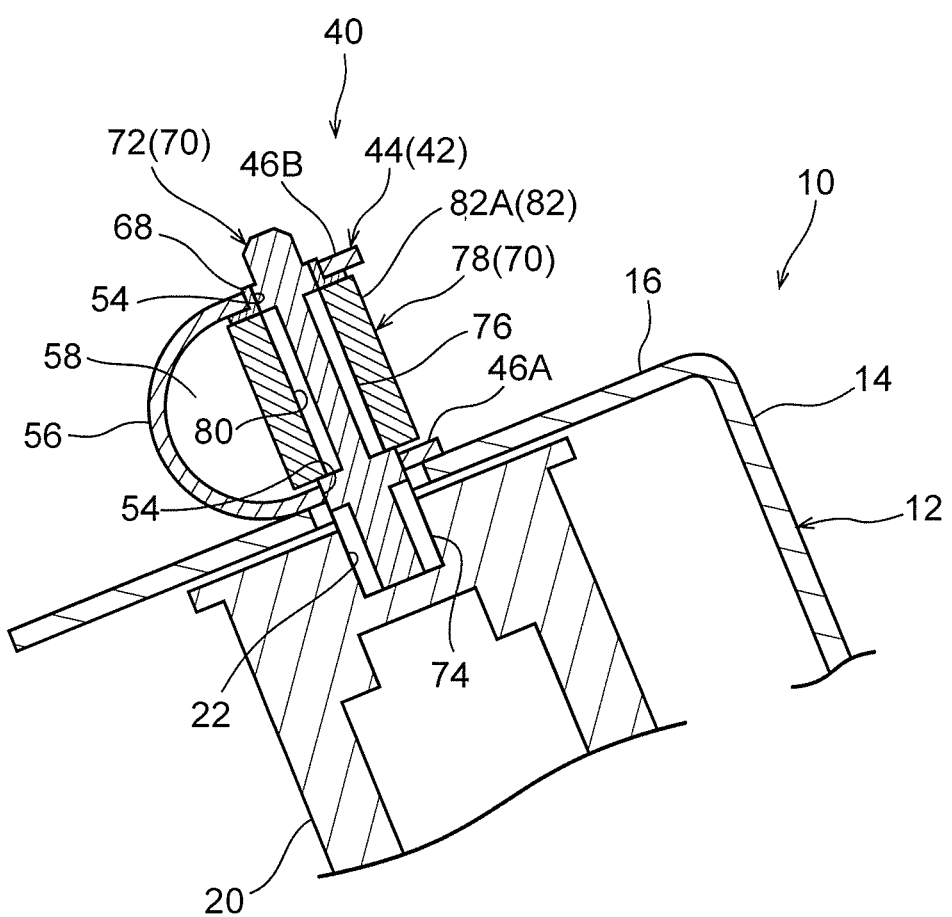
FIG. 5 is a cross-section view illustrating a fitted state of the pinion and the spool illustrated in FIG. 3, as viewed from another length direction side of the cylinder (viewed in cross-section taken along line 5-5 in FIG. 3)

As shown in FIG. 5, the bottom wall 56 is formed in a semicircle as viewed along the length direction of the cylinder 42, and connects the pair of side walls 46A and 46B. Space inside the bottom wall 56 configures a through-passage portion 58 (see FIG. 4 and FIG. 5).

A lower portion (a portion at another side in the length direction) of the cylinder 42 is configured as a housing portion 60 as shown in FIGS. 1 to 4. The housing portion 60 is formed in a circular cylinder (tube) shape, formed so as to be connected to the guide portion 44. Namely, cross-section of the housing portion 60 is a closed cross-section profile, with the inside of the housing portion 60 and the inside of the guide portion 44 in communication with each other. A cylinder holder 64 (see FIG. 1) is provided at an outer peripheral portion of the housing portion 60, and the cylinder holder 64 is formed with a substantially U-shaped cross-section, opening toward the frame 12 side. Both end portions of the cylinder holder 64 are fixed to the leg plate 16 of the frame 12 by a bolt or the like, not shown in the drawings, with a state in which the housing portion 60 is disposed inside the cylinder holder 64. The lower portion of the cylinder 42 is thereby fixed to the frame 12.

A cylinder side flange portion 62 (see FIG. 4) is integrally formed to an inner peripheral portion of the housing portion 60. The cylinder side flange portion 62 is formed with a circular ring shape as viewed along the length direction of the cylinder 42 and protrudes toward the radial direction inside of the cylinder 42.

As shown in FIG. 1 and FIG. 5, a pinion 70 is configured to include: the pinion shaft 72 that configures an axial portion of the pinion 70; and a pinion main body 78. The pinion shaft 72 is formed with a shaft shape, and disposed inside the supporting holes 54 so as to span across between the pair of the side walls 46A and 46B of the guide portion 44. One axial direction end portion (the arrow C direction side end portion in FIG. 1) of the pinion shaft 72 is rotatably supported, through a substantially circular cylindrical shaped collar 68, by the supporting hole 54 of the side wall 46B of the cylinder 42. Another axial direction end portion of the pinion shaft 72 is rotatably supported by the supporting hole 54 of the side wall 46A of the cylinder 42. Namely, the pinion shaft 72 is rotatably supported at both axial ends by the pair of side walls 46A and 46B, respectively.

At the other axial direction end of the pinion shaft 72, the first fitting portion 74 is formed. The first fitting portion 74 is formed with a splined shaped corresponding to the fitted-into concave portion 22 of the spool 20, described above, as viewed along the axial direction of the pinion shaft 72. The first fitting portion 74 is inserted inside the fitted-into concave portion 22 of the spool 20, with the pinion shaft 72 and the spool 20 configured so as to rotate integrally.

A second fitting portion 76 is formed at an axial direction intermediate portion of the pinion shaft 72, and the second fitting portion 76 is formed in a splined shape, as viewed along the axial direction of the pinion shaft 72.

The pinion main body 78 is formed as a substantially circular cylindrical (tube) shape. A fitted hole 80 is formed so as to penetrate the axial center portion of the pinion main body 78, and is formed with a spline shaped to correspond to the second fitting portion 76 of the pinion shaft 72, as viewed along the axial direction of the pinion main body 78. The second fitting portion 76 of the pinion shaft 72 is inserted inside the fitted hole 80, and the pinion shaft 72 and pinion main body 78 are configured so as to be rotatable integrally. The pinion main body 78 is disposed between the pair of side walls 46A and 46B. A gear wheel 82 is provided on an outer peripheral surface of the pinion main body 78 and the gear wheel 82 is configured by plural pinion teeth 82A.

Figure 6:
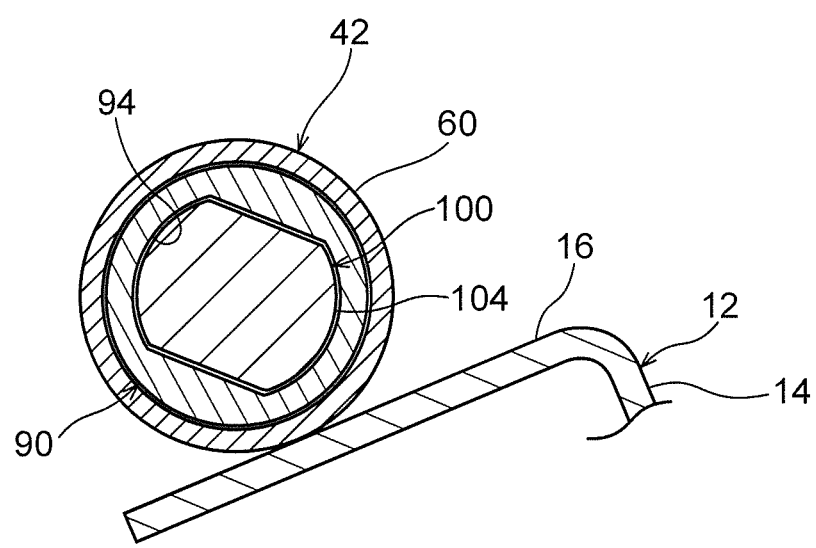
FIG. 6 is a cross-section view illustrating a fitted state of the gas generator and the piston illustrated in FIG. 4 as viewed from the other length direction side of the cylinder (viewed in cross-section taken along line 6-6 in FIG. 4)

As shown in FIG. 1 and FIG. 4, a piston 90 is formed in a columnar shape and is disposed at inside the housing portion 60 of the cylinder 42. The piston 90 is configured including: a base portion 92 that configures a lower portion of the piston 90; and a rack 98 that configures an upper portion of the piston 90. The base portion 92 is formed with a substantially circular column shape and is disposed coaxially to the housing portion 60. An engaged concave portion 94 (see FIG. 4) is formed at an axial center portion of a lower face of the base portion 92, and the engaged concave portion 94 is formed substantially race track shaped as viewed along the axial direction of the base portion 92 (see FIG. 6). The cylinder side flange portion 62, described above, abuts an outer peripheral portion of a lower face of the base portion 92.

A groove portion 96 is formed at a lower end side location of an outer peripheral portion of the base portion 92. The groove portion 96 is formed in concave shape open toward a radial direction outside of the base portion 92, and is formed running along the circumferential direction of the base portion 92. A circular ring shaped O-ring 106 (see FIG. 4) is disposed inside the groove portion 96, with the O-ring 106 configured by rubber or the like so as to have elastic and sealing characteristics. An inner peripheral face of the cylinder 42 (the housing portion 60) is in contact with the O-ring 106, with the O-ring 106 in a deformed state, and a seal is accordingly performed by the O-ring 106 between the cylinder 42 (the housing portion 60) and the piston 90.

The rack 98 is formed as substantially semicircular column shape. The rack 98 extends from one end portion (an end portion at one side in the length direction of the cylinder 42) of the base portion 92 toward the one side in the length direction of the cylinder 42, and extends up to the near side (vicinity) of the pinion 70. The rack 98 is thereby disposed inside the housing portion 60 and inside the through-passage portion 58 of the guide portion 44. Moreover, an outer peripheral face of the rack 98 is formed in the same plane (face) as an outer peripheral face of the base portion 92, and a portion at the pinion 70 side of the rack 98 is formed with plural rack teeth 98A. Configuration is made such that when the piston 90 is moved toward the one side in the length direction of the cylinder 42, the rack teeth 98A of the rack 98 mesh with the pinion teeth 82A of the pinion 70, so as to rotate the pinion 70 and the spool 20 in the take-up direction. A portion at an upper face of the base portion 92, where rack 98 is not formed, configures an abutting portion 92A. The abutting portion 92A is configured to abut the pinion 70 so as to stop the movement of the piston 90. At this time, the rack 98 and the bolt 66 are set so as to overlap with each other, as viewed from the bottom wall 56 side of the guide portion 44.

The gas generator 100 is formed with a substantially circular columnar shape, and is disposed inside the housing portion 60 of the cylinder 42 and at a lower side of the piston 90. A generator side flange portion 102 is integrally formed at an outer peripheral portion of a lower end portion (an end portion at another side in the length direction of the cylinder 42) of the gas generator 100. The generator side flange portion 102 protrudes toward the radial direction outside of the gas generator 100. The generator side flange portion 102 is fixed to the lower end of the cylinder 42 by caulking or the like, and the lower end of the cylinder 42 is closed off by the gas generator 100. In this state, an upper face of the generator side flange portion 102 abuts the cylinder side flange portion 62 of the cylinder 42.

An upper end portion (an end portion at the one side in the length direction of the cylinder 42) of the gas generator 100 is formed substantially race track shaped in cross-section, that corresponds to the engaged concave portion 94 of the piston 90 (see FIG. 6), and this portion of the gas generator 100 configuring an engagement portion 104. The engagement portion 104 is inserted inside the engaged concave portion 94, and configured so as to restrict rotation of the piston 90 in circumferential direction of the cylinder 42.

The gas generator 100 is electrically connected to a controller (not shown in the drawings) of the vehicle, and the controller is electrically connected to the a collision detection unit, not shown in the drawings. The collision detection unit predicts a vehicle collision according to, for example, an acceleration sensor that detects changes in speed (acceleration) (especially rapid deceleration) of the vehicle, or a distance sensor that detects the distance to an obstacle in front of the vehicle. Configuration is made such that the collision detection unit detects the vehicle-collision by that the acceleration sensor detects a collision acceleration of a predetermined reference value or above, and the gas generator 100 is configured so as to actuate in this event. Configuration is made such that high pressure gas is generated rapidly by the gas generator 100 when the gas generator 100 actuates, and this gas is supplied to inside the engaged concave portion 94 of the piston 90 and to inside the cylinder 42. Configuration is made such that the piston 90 is thereby moved toward the one side in the length direction of the cylinder 42.

The stopper plate 110 is disposed at the guide portion 44 inside at the upper end portion of the cylinder 42 with a plate thickness direction of the stopper plate 110 aligned with the length direction of the cylinder 42. A pair of attachment tabs 112 is integrally formed to both respective width direction end portions of the stopper plate 110 at the open side of the guide portion 44, and the attachment tabs 112 are bent from the stopper plate 110 toward the other side in the length direction of the cylinder 42. The attachment tabs 112 are each formed with an attachment hole 112A. The attachment holes 112A are formed with circular shapes and disposed coaxially to the fixing hole 50. The bolt 66, described above, penetrates through the inside of the attachment holes 112A.

An anchoring tab 114 is integrally formed to an end portion, at the bottom wall 56 side, of the stopper plate 110. The anchoring tab 114 protrudes from the stopper plate 110 toward the bottom wall 56 side, and is disposed inside an anchoring hole 56A (see FIG. 4) formed in the bottom wall 56. Movement of the stopper plate 110 in the length direction of the cylinder 42 is thereby restricted.

A pair of abutting tabs 116 are formed integrally to both width direction end portions of the stopper plate 110. The abutting tabs 116 protrude from the stopper plate 110 toward width direction outsides of the stopper plate 110, and abut side walls 46A and 46B.

A positioning tab 118 is integrally formed to the stopper plate 110. The positioning tab 118 bends from the stopper plate 110 toward the one side in the length direction of the cylinder 42, and then bends toward the frame 12 side. A leading end portion of the positioning tab 118 is disposed inside a rectangular shaped positioning hole 16C (see FIG. 4) formed in the leg plate 16 of the frame 12.

The operation of the present exemplary embodiment is described below.

In the webbing take-up device 10 configured as described above, when the webbing 24 is worn by an occupant seated in a vehicle seat, a biasing force is applied to the spool 20 in the take-up direction by the biasing mechanism 30. Slack in the webbing 24 is thereby eliminated.

When the vehicle rapidly decelerates or when the webbing 24 is pulled out rapidly, the locking mechanism is actuated, and the rotation of the spool 20 in the pull-out direction is restricted. Pulling out of the webbing 24 from the spool 20 is thereby restricted, and the body of the occupant is restrained by the webbing 24.

When a vehicle collision is detected by the collision detection unit, the gas generator 100 rapidly generates high pressure gas according to the control of the controller, and the gas is supplied to the inside of the engaged concave portion 94 of the piston 90 and to the inside of the housing portion 60 of the cylinder 42. The gas pressure thereby moves the piston 90 through inside the through-passage portion 58 toward the one side in the length direction of the cylinder 42. The piston 90 is then guided by (an inner peripheral face of) the bottom wall 56 of the cylinder 42.

When the piston 90 moves toward the one side in the length direction of the cylinder 42, the rack 98 (the rack teeth 98A) of the piston 90 mesh with the gear wheel 82 (the pinion teeth 82A) of the pinion main body 78, and the pinion 70 and the spool 20 are rotated in the take-up direction. As a result, the webbing 24 is taken up on the spool 20, and the restriction force of the webbing 24 upon the occupant is increased. If the piston 90 moves further, the abutting portion 92A of the piston 90 abuts the pinion main body 78, and the movement of the piston 90 is stopped. Note that in this time the rack 98 and the bolt 66 lap with each other when viewed from the bottom wall 56 side of the cylinder 42.

The cylinder 42 includes the housing portion 60 that houses the piston 90. Furthermore, the cylinder 42 includes the guide portion 44, and the guide portion 44 extends from one end portion in the length direction of the housing portion 60. Namely, the cylinder 42 that includes the housing portion 60 and the guide portion 44 is configured as a single member. The pinion 70 is rotatably supported by the guide portion 44, and the movement of the piston 90 is guided by the guide portion 44.

Configuration of the webbing take-up device 10 is thereby made such that the piston 90 and the pinion 70 are provided at the cylinder 42 that is configured as a single member, so it is unnecessary to provide separate members, namely, a member that rotatably supports the pinion 70 and another member that houses the piston 90. An increase in the number of components can thereby be suppressed. The respective positions of the piston 90 and the pinion 70 are determined by means of the cylinder 42. Consequently, good positioning precision between the piston 90 and the pinion 70 can thereby be ensured compared to a case where a member to rotatably support the pinion 70 and a member to house the piston 90 are separately provided.

The cylinder 42 is formed using circular cylindrical shaped piping member. Thus, it is possible to form the inner peripheral face of the housing portion 60 and the inner peripheral face of the bottom wall 56 of the guide portion 44 by making use of comparatively high complete round characteristic (complete circularity) of the piping member. Smooth movement of the piston 90 inside the cylinder 42 is thereby enabled, and stable movement of the piston 90 inside the cylinder 42 is enabled.

The guide portion 44 of the cylinder 42 is formed in a groove shape that is open toward the radial direction outside of the cylinder 42. Namely, the guide portion 44 is formed with an open cross-section profile. The guide portion 44 is configured including the pair of side walls 46A and 46B, and the bottom wall 56. The pinion main body 78 is disposed between the pair of side walls 46A and 46B, and the pinion 70 (the pinion main body 78) is rotatably supported by the pair of side walls 46A and 46B. An inside portion of the bottom wall 56 is configured as the through-passage portion 58, and when the piston 90 moves, the piston 90 moves through inside the through-passage portion 58, and the piston 90 is guided by the bottom wall 56. So, even though the cylinder 42 is configured as a single member, it is accordingly possible to rotatably support the pinion 70 and guide the movement of the piston 90 by configuring the guide portion 44 as a groove shape (an open cross-section profile). It is thereby possible to rotatably support the pinion 70 and to guide the piston 90 by means of a simple configuration.

The positioning precision between the supporting holes 54 and the bottom wall 56 can be further improved due to the pair of side walls 46A and 46B that are formed with the supporting holes 54 being formed continuously to the bottom wall 56 that guides the movement of the piston 90. Thereby, the allowance degree (amount) of tooth meshing between the piston 90 and the pinion 70 when the piston 90 moves can be ensured, and good meshing between the piston 90 and the pinion 70 is enabled.

As viewed from the bottom wall 56 side of the guide portion 44, the bolt 66 overlaps with the rack 98 of the piston 90 when the piston 90 has moved to the maximum extent (when the abutting portion 92A of the piston 90 abuts the pinion 70). It is thus possible to set the length of the cylinder 42 in the length direction thereof shorter than in a case where the bolt 66 is disposed more toward the one side in the length direction of the cylinder 42 than the piston 90 when the piston 90 has moved to the maximum extent. The cylinder 42 can accordingly be suppressed from becoming larger.

The piston 90 is stopped when the abutting portion 92A of the piston 90 abuts the pinion 70. Thus the pinion 70 can also be used as a stopper member that stops the movement of the piston 90, it is not needed to install a dedicated stopper member. An increase in the number of components can be suppressed thereby.

The guide portion 44 is formed as a U-shaped groove as described above. Therefore the pinion main body 78 is inserted from the open portion of the guide portion 44 and the pinion shaft 72 is inserted inside the pinion main body 78, thereby the pinion shaft 72 and the pinion main body 78 can be installed in the guide portion 44 (the cylinder 42). Simple assembly of the pinion 70 to the guide portion 44 (the cylinder 42) is enabled thereby.

The pair of abutting tabs 116 are each formed integrally to both width direction end portions of the stopper plate 110 and the pair of abutting tabs 116 abut the side walls 46A and 46B of the guide portion 44. Thus when the upper end portion of the cylinder 42 is fixed to the frame 12 by means of the bolt 66, even if the side wall 46B is pushed toward the side wall 46A side, deformation of the side wall 46B toward the side wall 46A side at the guide portion 44 can be suppressed. Thus, the space in the through-passage portion 58 that permits the movement of the piston 90, and the distance (separation) between the pair of support walls 46A and 46B that permit the rotation of the pinion main body 78 can be effectively ensured (obtained) even though the guide portion 44 is formed as a U-shaped groove (open cross-section shape).

The pinion 70 (the pinion shaft 72) is rotatably supported by the side walls 46A and 46B of the guide portion 44 at both axial direction end portions of the pinion 70. Thus, sufficient strength of the pinion 70 at a time when the abutting portion 92A of the piston 90 abuts the pinion 70 can be ensured (achieved).

The cut-out portion 48 is formed in the cylinder 42 at the portion where the pair of side walls 46A and 46B converge. Thus when the guide portion 44 is formed by press process for example, the generation of a crack or the like at the cut-out portion 48 can be suppressed, enabling good cylinder 42 formation.

The engagement portion 104 of the gas generator 100 is inserted inside the engaged concave portion 94 of the piston 90. The sealing performance achieved by the O-ring 106 between the piston 90 and the cylinder 42 can be increased thereby. Namely, since the gas generated by the gas generator 100 is supplied to the engaged concave portion 94 inside, the generator side flange portion 102 expands toward the radial direction outside of the gas generator 100 due to the gas pressure, and the O-ring 106 is pushed by the gas generator 100. The sealing performance achieved by the O-ring 106 between the piston 90 and the cylinder 42 can be increased thereby.

The engagement portion 104 of the gas generator 100 is inserted inside the engaged concave portion 94 of the piston 90 thereby enabling a shortening of the combined axial direction length of the gas generator 100 and the piston 90 in the assembled state. The axial direction length of the cylinder 42 can thereby be set shorter, enabling becoming larger of the cylinder 42 to be suppressed.

The lower face of the piston 90 and the upper face of the gas generator 100 abut the cylinder side flange portion 62 of the cylinder 42, thereby enabling the cylinder side flange portion 62 to be used for positioning when the piston 90 and the gas generator 100 are assembled to the cylinder 42.

Note that in the present exemplary embodiment, the cylinder 42 is formed using circular cylindrical shaped piping member. Alternatively, the cylinder 42 may be formed by, for example, casting.

In the present exemplary embodiment, the pinion 70 is connected to the spool 20 such that they are rotatable integrally. Alternatively, for example, a clutch may be installed between the pinion 70 and the spool 20, the pinion 70 and the spool 20 configured connected so as to rotate integrally when the pinion 70 is rotated by the piston 90.

In the present exemplary embodiment, it is set such that the pinion 70 abuts the abutting portion 92A of the piston 90 when the piston 90 is moved to the maximum extent. Alternatively, it may be set such that the rack 98 of the piston 90 abuts the stopper plate 110 when the piston 90 is moved to the maximum extent.

What is claimed is:

1. A webbing take-up device, comprising:
   a spool that takes up a webbing by rotating in a take-up direction; a pinion that is rotatable;
   a piston that moves under actuation of a gas generator, and that meshes with the pinion when moving, whereby the spool is rotated in the take-up direction according to rotation of the pinion; and
   a cylinder that houses the piston and rotatably supports the pinion and that is configured from a single member and that includes:
   a tube shaped housing portion that houses the piston, and
   a guide portion that guides movement of the piston, that extends from one end portion of the housing portion in a length direction of the housing portion toward a moving direction side of the piston, and that rotatably supports the pinion,
   wherein:
   the guide portion is formed in a groove shape that is open toward an outer side in a radial direction of the cylinder, and is configured to include a pair of side walls disposed facing each other and a bottom wall that connects the pair of side walls;
   a support portion that rotatably supports the pinion is formed at the pair of side walls; and
   a through-passage portion that permits movement of the pinion is formed inside the bottom wall.

2. The webbing take-up device of claim 1, wherein the cylinder is configured by a pipe member.

3. The webbing take-up device of claim 2, wherein an abutting portion is formed at the piston, and movement of the piston is stopped by the abutting portion abutting the pinion.

4. The webbing take-up device of claim 1, wherein:
   the side walls are fixed by a fixing member to a frame that supports the spool; and the fixing member is disposed such that the fixing member and the piston overlap when the piston has moved a maximum extent as viewed from the bottom wall side of the guide portion.

5. The webbing take-up device of claim 1, wherein an abutting portion is formed at the piston, and movement of the piston is stopped by the abutting portion abutting the pinion.

6. The webbing take-up device of claim 1, wherein the housing portion is formed in a circular cylinder shape, and the guide portion includes a pair of side walls that are parallel to the axis of rotation of the housing portion.

7. The webbing take-up device of claim 6, wherein the cylinder is configured from a single linear member, and the movement of the piston is linear.

8. The webbing take-up device of claim 6, wherein the guide portion is configured including the pair of side walls and a bottom wall formed in a semicircle as viewed along a length direction of the cylinder.

* * * * *